United States Patent [19]

Blatt et al.

[11] Patent Number: 5,261,715
[45] Date of Patent: Nov. 16, 1993

[54] WORK HOLDER SUPPORT APPARATUS

[75] Inventors: John A. Blatt, 22 Stratton Pl., Grosse Pointe Shores, Mich. 48236; David C. Tomlin, Mt. Clemens, Mich.

[73] Assignee: John A. Blatt, Grosse Point Shores, Mich.

[21] Appl. No.: 803,778

[22] Filed: Dec. 5, 1991

Related U.S. Application Data

[60] Division of Ser. No. 563,253, Aug. 6, 1990, abandoned, which is a continuation-in-part of Ser. No. 271,178, Nov. 14, 1988, Pat. No. 4,957,318.

[51] Int. Cl.$^5$ .................................................. B25J 15/00
[52] U.S. Cl. .................................... 294/88; 294/86.41
[58] Field of Search .................. 294/88, 86.4, 86.41; 248/288.5, 288.3, 484, 487; 403/90, 56, 55

[56] References Cited

U.S. PATENT DOCUMENTS

| | | |
|---|---|---|
| 229,670 | 7/1880 | Carrick . |
| 1,468,110 | 9/1923 | Howe ................................ 248/229 |
| 1,543,037 | 6/1925 | Teeter ................................ 403/56 |
| 1,929,361 | 10/1933 | Liljebladh . |
| 2,141,945 | 12/1938 | Tweedale ............................ 403/56 |
| 2,212,156 | 8/1940 | Erdley ................................ 248/229 |
| 2,295,051 | 9/1942 | Roth . |
| 2,381,657 | 8/1945 | Eksergian et al. .................. 294/88 |
| 2,452,406 | 10/1948 | Volkery et al. .................... 403/391 |
| 2,469,542 | 5/1949 | Becker ................................ 403/391 |
| 2,565,793 | 8/1951 | Weismantel ....................... 248/205.9 |
| 2,651,026 | 9/1953 | Roth . |
| 2,776,168 | 1/1957 | Schweda ............................ 248/288.5 |
| 2,791,623 | 5/1957 | Lock et al. . |
| 2,858,522 | 10/1958 | Wengen et al. .................... 403/391 |
| 3,146,982 | 9/1964 | Budnick ............................. 248/229 |
| 3,349,927 | 10/1967 | Blatt . |
| 3,350,132 | 10/1967 | Ashton .............................. 294/88 |
| 3,568,959 | 3/1971 | Blatt . |
| 3,613,904 | 10/1971 | Blatt . |
| 3,635,514 | 1/1972 | Blatt ................................. 294/88 X |
| 3,677,584 | 7/1972 | Short . |
| 3,712,415 | 1/1973 | Blatt et al. . |
| 4,275,872 | 6/1981 | Mullis . |
| 4,355,922 | 10/1982 | Sato .................................. 248/229 |
| 4,382,572 | 5/1983 | Thompson ........................ 248/484 |
| 4,453,755 | 6/1984 | Blatt et al. . |
| 4,473,249 | 9/1984 | Valentine et al. .................. 294/88 |
| 4,480,497 | 11/1984 | Locher .............................. 403/328 |
| 4,495,834 | 1/1985 | Bauer et al. ...................... 403/328 |
| 4,515,336 | 5/1985 | Fischer ............................ 248/288.3 |
| 4,596,415 | 6/1986 | Blatt ................................. 294/88 |
| 4,708,297 | 11/1987 | Boers ............................... 403/328 |

*Primary Examiner*—Joseph D. Pape
*Attorney, Agent, or Firm*—Basile and Hanlon

[57] ABSTRACT

A work holder support apparatus includes an elongate support member having an undercut longitudinal slot. A base plate at one side of the support member carries a spherical ball and a clamp bolt seated in a recessed bore in the ball passes through the base plate and slot to be threadably received in a first clamp plate at the opposite side of the support member. An elongate work holder mounting member and a second clamp plate cooperatively define a ball receiving socket at one end of the mounting member enabling the mounting member to be clamped at any of a wide range of rotative adjustments relative to the ball. An opening into the socket affords access to the recessed clamping bolt head.

15 Claims, 4 Drawing Sheets

5,261,715

WORK HOLDER SUPPORT APPARATUS

RELATED APPLICATIONS

This application is a division application of copending U.S. Ser. No. 07/563,253, filed Aug. 6, 1990, abandoned which is a continuation-in-part of copending U.S. patent application Ser. No. 07/271,178 filed Nov. 14, 1988, now U.S. Pat. No. 4,957,318.

BACKGROUND OF THE INVENTION

The present invention relates to a support apparatus for supporting work holders, particularly in applications where a plurality of work holding devices are employed to grip or clamp a panel type work piece at several different locations to stably support the panel either in a fixed position for the performance of a work operation on the panel or to transfer the panel from one work station to another.

An apparatus of this type is typically, but not exclusively, used in automotive related applications to handle panels which are to be subsequently assembled into a vehicle door or vehicle body. These panels typically have lengths and widths of two or more feet and are frequently of irregular shape or formed with irregular openings so that in order to stably and firmly support the panel, it is necessary that the work holders grip the panel at several locations along its peripheral edge or the edges of major openings in the panel. The work holders, which typically take the form of grippers of a general type shown in U.S. Pat. Nos. 3,635,514 or 4,449,745, clamps or vacuum cups, are typically mounted on support members or a support frame by means of a ring type clamp which is received on a cylindrical support rod. This arrangement allows the individual work holder to be adjusted longitudinally of the support rod and rotatively about the axis of the support rod and then clamped by the ring clamp in the adjusted position. Because of the irregular shape of panels handled by this particular type of apparatus and the fact that automated production procedures can require extremely precise positioning of the panel relative to tooling employed to operate on the panel, the two degree of freedom adjustment capability of the rod—ring clamp arrangement just described does not always enable all of several work holders to be accurately and independently positioned relative to one another. The present invention is directed to a work holder support apparatus which provides a greatly improved flexibility of adjustment.

SUMMARY OF THE INVENTION

In accordance with the present invention, a support member takes the form of an elongate hollow tubular member having a longitudinal slot through one web or side wall. A spherical ball is fixedly mounted on a base plate which will bridge the slot on the outer side of the web of the support member and a clamping bolt with a head recessed in the ball passes diametrically through the ball, base plate and slot to be threadably received by a clamping plate bridging the slot at the inner side of the support web. This arrangement permits the ball to be clamped in any selected position longitudinally of the support member.

An elongate work holder mounting member has a clamp plate mounted at one end to the mounting member by a pair of clamping screws. The opposed faces of the clamp member and the mounting member end are formed with concave recesses which cooperatively define a ball receiving socket by means of which the mounting member and clamp plate may be clamped to the ball at selected positions of rotary adjustment in any of three mutually perpendicular planes intersecting the center of the spherical ball. Bores or other structure for mounting a work holder are located on the mounting member adjacent the end of the mounting member remote from the clamping member.

In accordance with a preferred embodiment of the present invention, an elongate work holder mounting member has first and second clamping plates mounted at each end to the mounting member by a pair of clamping screws. The opposed faces of the clamping members and the mounting member ends are formed with concave recesses which cooperatively define first and second ball receiving sockets by means of which the mounting member and clamp plates may be clamped to first and second balls at selected positions of rotary adjustment in any of three mutually perpendicular planes intersecting the center of each spherical ball. In this embodiment, a mounting plate is provided with suitable means for mounting a work holder on the remote or distal end of the mounting member. The mounting plate includes the second spherical ball.

Other objects and features of the invention will become apparent by reference to the following specification and to the drawings.

DESCRIPTION OF THE PREFERRED EMBODIMENT

Figure 1:
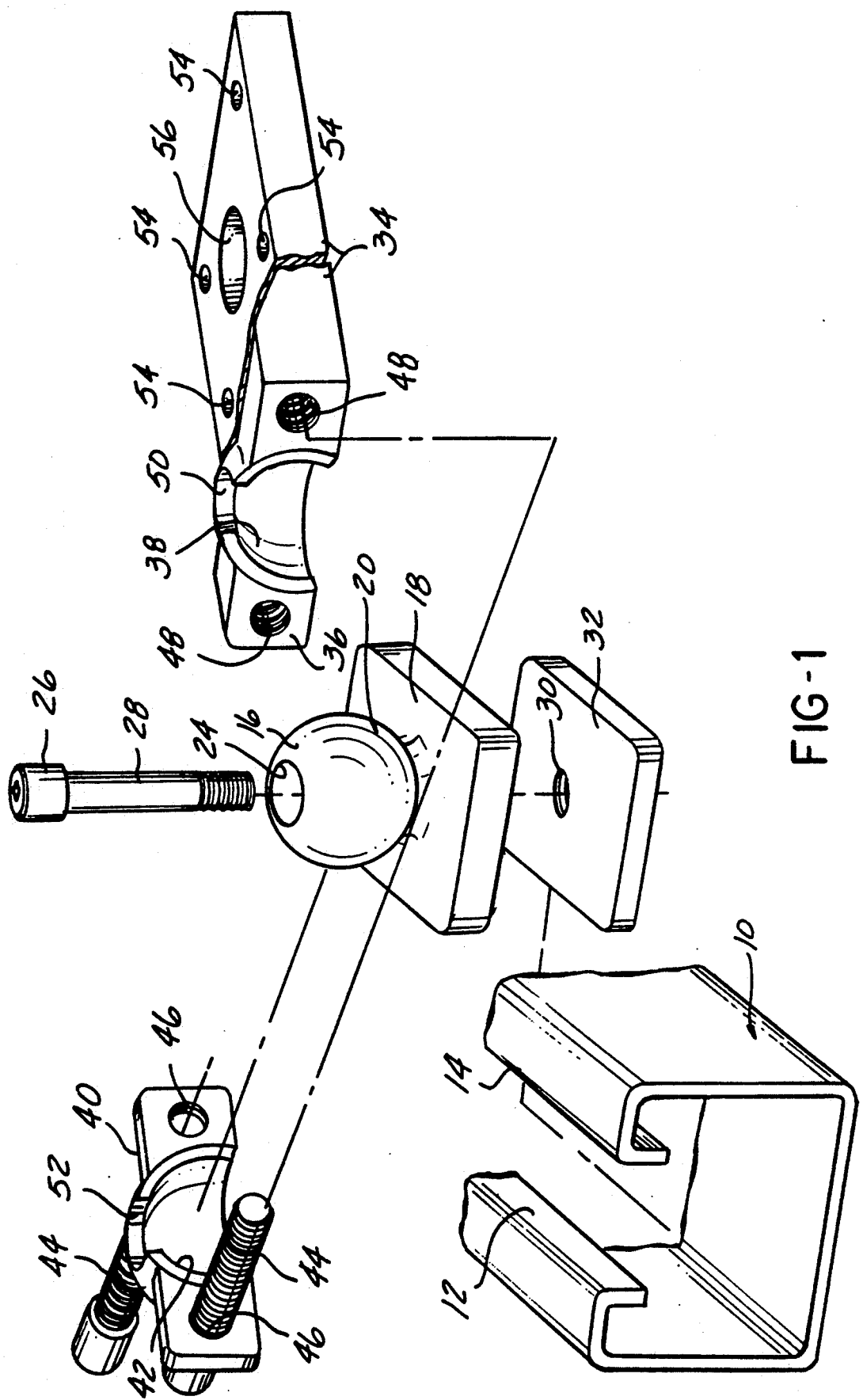
FIG. 1 is an exploded perspective view of the components of the present invention.

A work holder support apparatus embodying the present invention employs a support member in the form of a rigid elongate hollow tubular support member 10 formed with an elongate slot 12 extending lengthwise of one side 14 of member 10. The support member 10 shown in the drawings is of hollow box shaped transverse cross section, other cross sectional configurations may obviously be used, as long as the configuration presents a longitudinally extending undercut slot.

Figure 2:
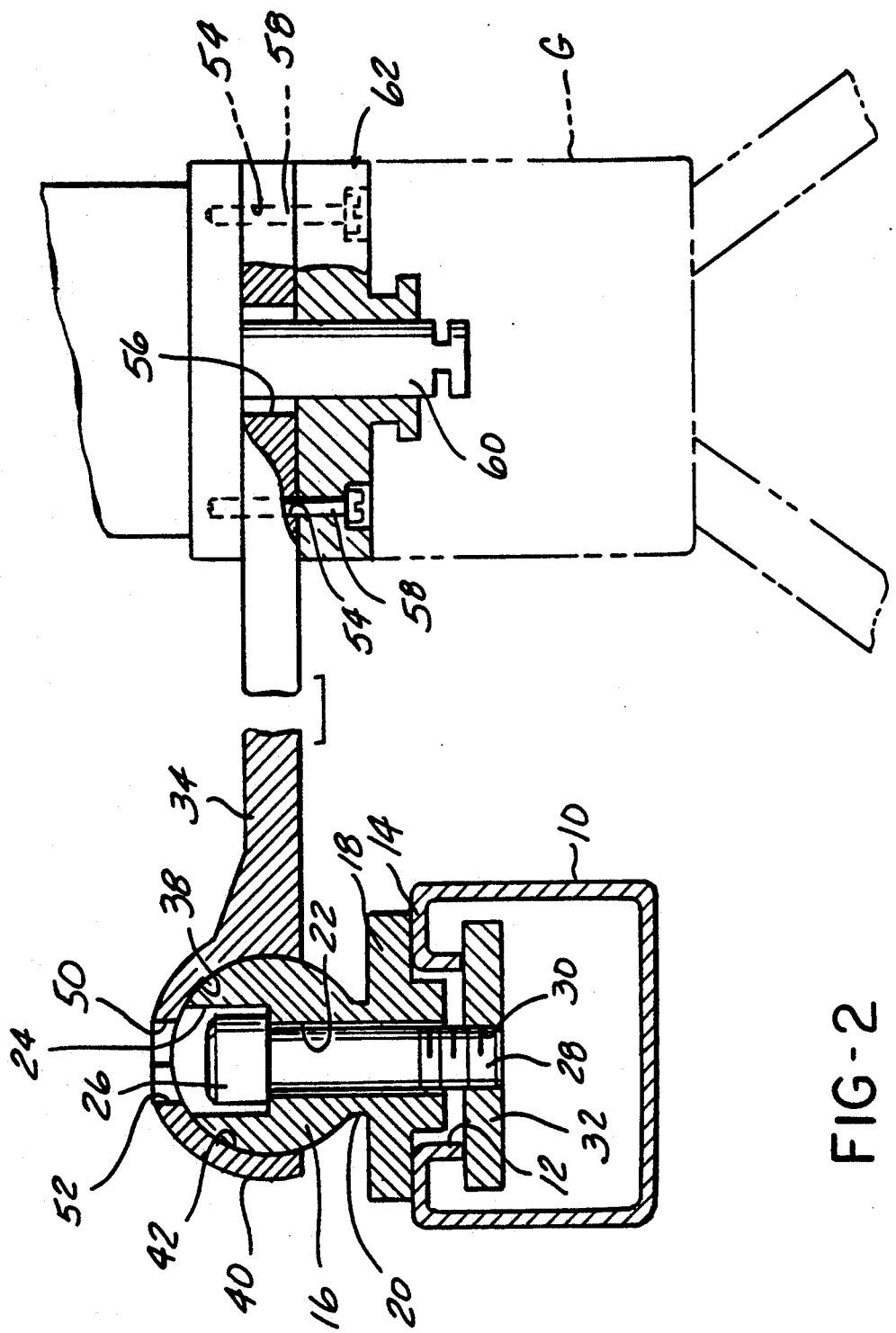
FIG. 2 is a cross sectional view, with certain parts broken away or shown only partially in section, of an assembled apparatus embodying the present invention.

A spherical ball 16 is fixedly mounted on a base plate 18, the ball as shown being integrally formed on the base plate and coupled to the base plate via a reduced diameter neck 20. A bore 22 extends diametrically through the ball neck and base plate and is formed with an enlarged diameter counter bore 24 at its upper end which defines a recessed seat for the head 26 of a clamping bolt 28. As best seen in FIG. 2, the lower end of bolt 28 projects downwardly from base plate 18 through slot 12 and is threadably received in a tapped bore 30 through a clamp plate 32 located in the interior of support member 10 and bridging slot 12. It is believed apparent that bolt 28 may be loosened a sufficient amount to permit the base plate and clamping plate to be slid longitudinally along web 14 to a selected position of longitudinal adjustment relative to support member 10 and then fixedly clamped in the selected position by tightening bolt 28 to clamp web 14 between base plate 18 and clamp plate 32.

A work holder mounting member in the form of an elongate plate like member 34 is formed with a flat end face 36 (FIG. 1) which in turn is formed with a concave semi-spherical recess 38 of a diameter equal to that of ball 16. A clamping plate 40 is formed with a semi-spherical recess 42 of similar shape and is mounted on the end 36 of mounting member 34 by means of a pair of clamping screws 44 which pass through bores 46 in clamping plate 40 to be threadably received in tapped bores 48 in end 36 of mounting plate 34. When assembled to each other, the clamping plate 40 and mounting member 34 are coupled to base plate 18 by a ball and socket joint constituted by ball 16 and the socket cooperatively defined by the recesses 38 and 42 in mounting member 34 and clamp plate 40. It is believed apparent that this coupling enables the adjustment of mounting plate 34 relative to ball 16 about any of three mutually perpendicular axes intersecting at the geometrical center of ball 16. Mounting member 34 and clamp plate 40 are provided with semicircular openings 50, 52 respectively which cooperatively define an access opening into the "socket" affording access to the head 26 of clamping bolt 28 when the mounting member 34 and clamp plate 40 are mounted on ball 16.

The end of mounting member 34 remote from clamp plate 40 is provided with suitable mears for mounting a work holder on the remote or distal end of the mounting member. In the particular form shown in the drawings, four symmetrically disposed bores 54 are located around a relatively large central bore 56 as best seen in FIG. 1 to provide openings through which a gripper actuator may be fixedly mounted on mounting member 34 as by bolts 58 passing through bores 54 with the piston rod 60 of the gripping actuator passing freely downwardly through bore 56. The gripper assembly G, in addition to the actuator, may include a quick disconnect coupling arrangement designated generally 62, see U.S. Pat. No. 4,596,415 for further details of a suitable quick disconnect coupling, or alternatively, the gripper may be provided with a swivelling jaw, as disclosed in U.S. Pat. No. 3,635,514, which enables the jaws of the gripper to be rotatively adjusted about the axis of its piston rod.

The combination of the capability of adjustably positioning ball 16 at any position longitudinally of support member 10 with the ball and socket interconnection between the ball and mounting member 34 enabling mounting member 34 to be rotatively adjusted about any of three mutually perpendicular axes intersecting at the center of ball 16, provides an extremely flexible positioning capability for the work holder mounted on the mounting member. By rotatively adjusting mounting member 34 about a vertical axis (the axis of bore 22 through the ball) the horizontal offset between the outer end of member 34 and support member 10 may be selected to be any distance equal to or less than the length of mounting member 34. Insofar as vertically positioning the distal end of mounting member 34, the member may be rotated about a horizontal axis parallel to slot 12 through an angle as viewed in FIG. 2 limited by the clearance between the lower side of mounting member 34 and base plate 18 and an upper limit limited by the engagement between the lower side of clamping plate 40 as viewed in FIG. 2 and base plate 18. The mounting member may be also rotatively adjusted relative to the ball about the longitudinal axis of the mounting member to tilt the work holder. When the work holder is provided with a swivel jaw device, such as that disclosed in U.S. Pat. No. 3,635,514, the orientation of the gripper jaws may be adjusted to match the configuration of the portion of the work piece which the jaws are to engage.

Referring now to FIGS. 3–6, a preferred embodiment of the present invention includes a support member in the form of a rigid elongate hollow tubular support member 10 formed with an elongate slot 12 extending lengthwise of one side 14 of member 10. The support member 10 shown in the drawings is of a hollow boxed shaped transverse cross section, other cross sectional configurations may obviously be used.

As previously described for FIGS. 1 and 2, a spherical ball 16 is fixedly mounted on a base plate 18, the ball as shown being integrally formed on the base plate and coupled to the base plate by a reduced diameter neck 20. A bore 22 extends diametrically through the ball neck and base plate and is formed with an enlarged diameter counter bore 24 at its upper end which defines a recessed seat for the head 26 of a clamping bolt 28. The lower end of bolt 28 projects outwardly from base plate 18 through slot 12 and is threadably received in a tapped bore 30 through a clamp plate 32 located in the interior of support member 10 and bridging slot 12. It is believed apparent that the bolt 28 may be loosened a sufficient amount to permit the base plate and clamping plate to be slid longitudinally along web 14 to a selected position of longitudinal adjustment relative to support member 10 and then fixedly clamped in the selected position by tightening bolt 28 to clamp support sidewall 14 between base plate 18 and clamp plate 32.

A work holder mounting member in the form of an elongate plate like member 64 is formed with first and second flat end faces 66a and 66b which in turn are formed with first and second concave semi-spherical recesses 68a and 68b. The recesses 68a and 68b have diameters generally equal to that of balls 16 and 82 respectively. First and second clamping plates 70a and 70b are formed with concave semi-spherical recesses 72a and 72b of similar shape and are mounted on the respective end faces 66a and 66b of mounting member 64 by means of a pair of clamping screws 74 which pass through bores 76 in clamping plate 70a to be threadably received in tapped bores 74a in clamping plate 74b. When assembled to each other, the clamping plate 70a and mounting member 64 are coupled to base plate 18 by a ball and socket joint defined by ball 16 and the socket cooperatively defined by the recesses 68a and 72a in the mounting member 64 and clamp plate 70a. It is believed apparent that this coupling enables the adjustment of mounting plate 64 relative to ball 16 about any of three mutually perpendicular axis intersecting at the geometrical center of ball 16.

Figure 3:
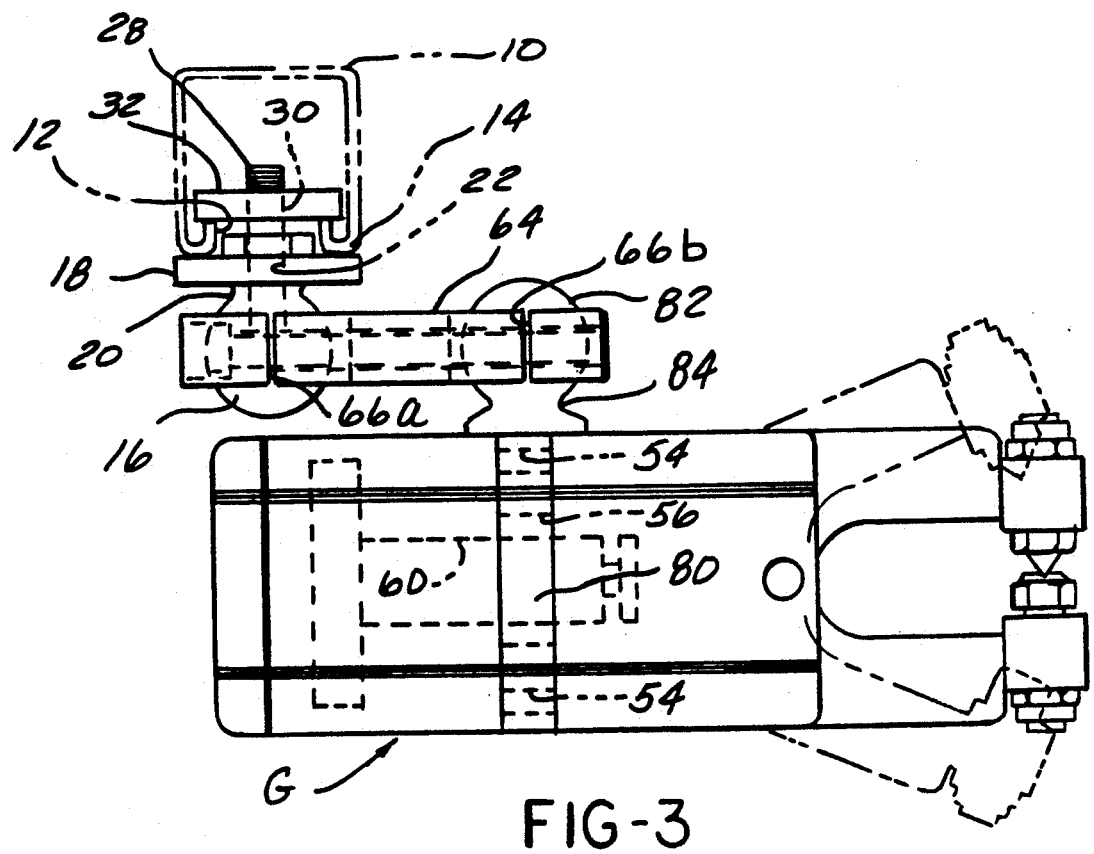
FIG. 3 is a side elevational view of a work holder support apparatus according to a preferred embodiment of the present invention.
Figure 4:
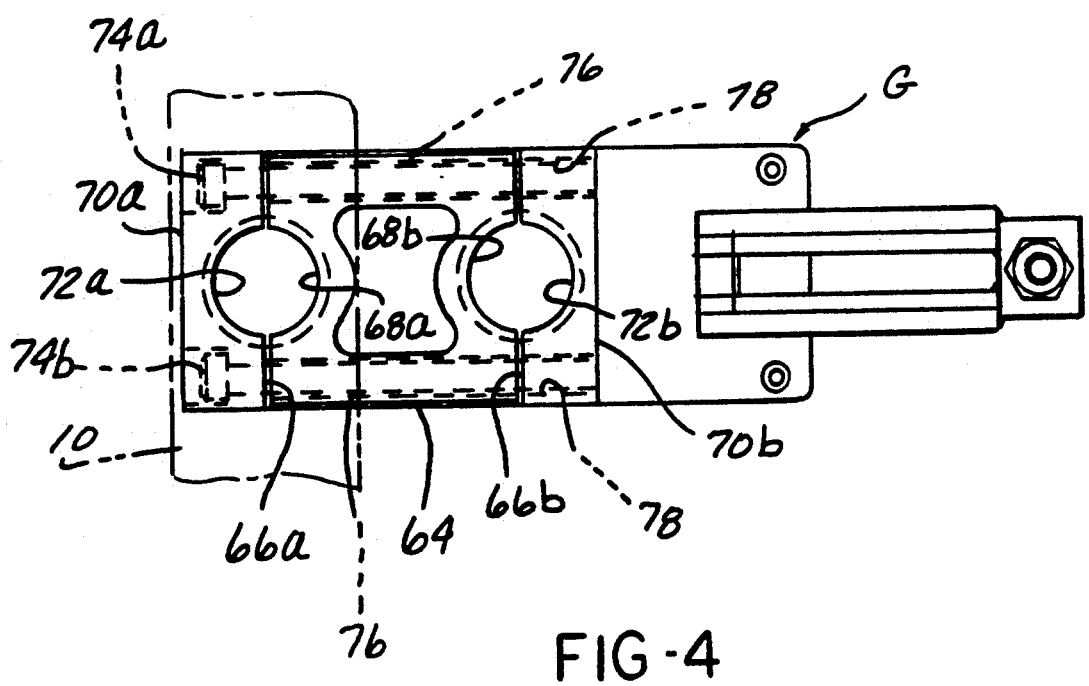
FIG. 4 is a plan view of the work holder support apparatus as shown in FIG. 3.
Figure 5:
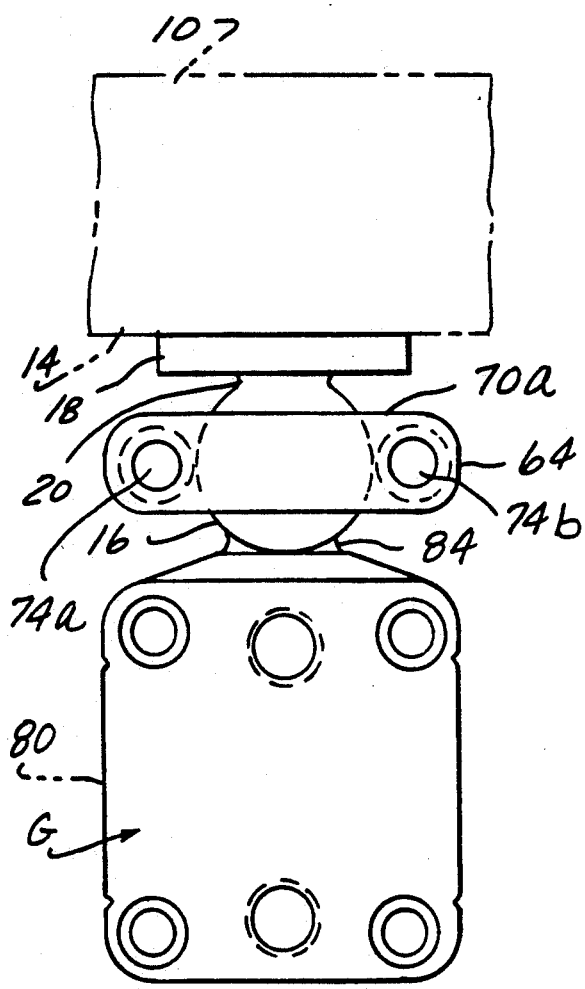
FIG. 5 is an end view of the work holder support apparatus as shown in FIG. 3.
Figure 6:
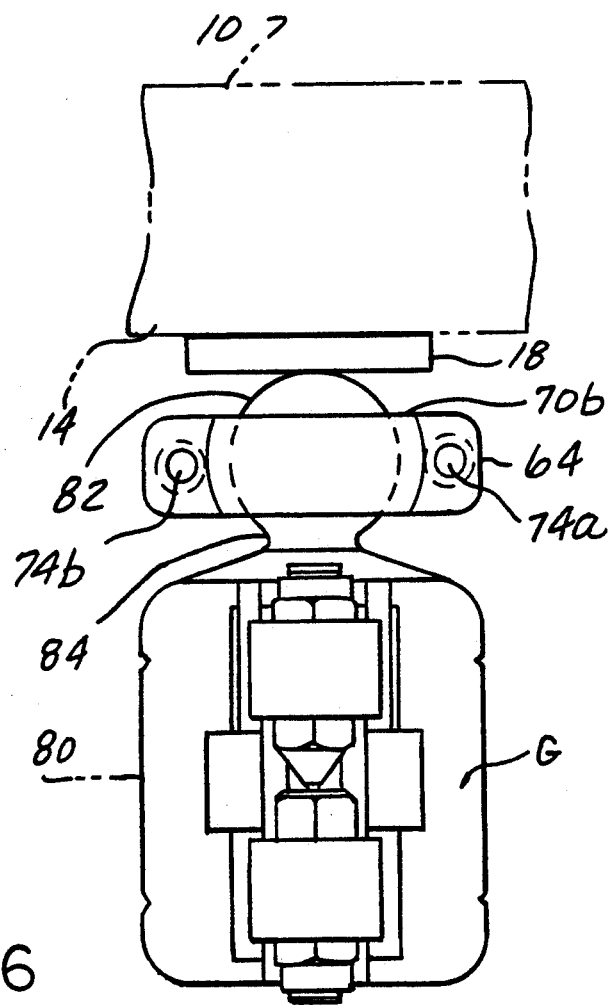
FIG. 6 is an opposite end view of the work holder support apparatus shown in FIG. 3.

The end of mounting member 64 remote from clamp plate 70a is provided with suitable means for mounting a work holder on the remote or distal end of the mounting member. In this preferred embodiment, the means for mounting includes a mounting plate 80 having a spherical ball 82 fixedly mounted on mounting plate 80. The ball 82 as shown being integrally formed on the mounting plate 80 and coupled to the mounting plate 80 via a reduced diameter neck 84. The mounting plate 80, in its preferred form, includes four symmetrically disposed bores 54 which are located around a relatively large central bore 56 to provide openings through which a gripper actuator may be fixedly mounted on mounting plate 80 as by bolts 58 passing through bores 54 with a piston rod 60 of a gripping actuator passing freely through the relatively large central bore 56 as illustrated in FIGS. 1-3. When assembled to each other, the clamping plate 70b and mounting member 64 are coupled by a ball and socket joint defined by ball 82 and the socket cooperatively defined by the recesses 68b and 72b in mounting member 64 and clamp plate 70b. It is believed apparent that this coupling enables the adjustment of mounting plate 64 relative to ball 82 about any of three mutually perpendicular axis intersecting at the geometrical center of ball 82. It is also believed apparent that the mounting plate 80 can be formed in any desired configuration, such that the ball 80 may be extending outwardly from the gripper assembly along any peripheral side edge desired.

The combination of the capability of adjustably positioning ball 16 at any position longitudinally of support member 10 with the first ball and socket interconnection between the ball 16 and mounting member 64 and the second ball and socket interconnection between the ball 82 and the mounting member 64 enabling mounting member 64 to be rotatably adjusted about any of three mutually perpendicular axis intersecting at the center of ball 16 and also rotatably adjusted about any of three mutually perpendicular axis intersecting at the center of ball 82, provides an extremely flexible positioning capability for the work holder mounted on the mounting member 64. The mounting member 64 can be rotated in a plane normal to the longitudinal axis of bore 22 through spherical ball 16. In addition, the mounting member 64 can be rotated in a plane containing the longitudinal axis of bore 22 of spherical ball 16. Furthermore, the mountinq member 64 can be rotated about the longitudinal axis of mounting member 64 within the physical limits of the ball and socket structure. It should also be apparent, that the work holder can be rotated in a plane parallel to the mounting member 64, rotated in a plane perpendicular to the mounting member 64, and the mounting member 64 can be rotated about its longitudinal axis with respect to the ball 82 within the structural limits of the first and second ball and socket joints. The work holder may also be provided with a swivel jaw device, such as that disclosed in U.S. Pat. No. 3,635,514, so that the orientation of the gripper jaws may be adjusted to match the configuration of the portion of the work piece which the jaws are to engage. In addition, the gripper assembly may include a quick disconnect coupling arrangement such as that disclosed in U.S. Pat. No. 4,596,415 if desired.

While one specific embodiment of the invention has been described in detail, as noted above, the disclosed embodiment may be modified. Therefore, the foregoing description is to be considered exemplary, rather than limiting, and the true scope of the invention is that defined in the following claims.

What is claimed is:

1. A work holder support apparatus for supporting a workpiece holder from a support member, the workpiece holder having a fluid operated actuator at one end with a driven member extending for operable connection with a gripper at another end, the work holder support apparatus comprising:

a mounting member interposed between the actuator and the gripper of the workpiece holder, the mounting member having an aperture allowing operable passage of the driven member from the actuator for connection to the gripper, said mounting member having a peripheral side edge;

means defining a spherical ball mountable on one of said support member and said mounting member at a desired location, said spherical ball means having a predetermined diameter;

an elongated bracket having first and second ends, and a middle portion extending between said first and second ends;

engaging means disposed on said bracket having a partial spherical surface defining an aperture for engaging the spherical ball means such that said bracket is rotatable about said spherical ball means for locating said bracket in a desired orientation between said support member and said mounting member;

locking means for locking said bracket in said desired orientation, said locking means including at least two bolts extending parallel to one another and spaced apart from one another by a distance greater than the predetermined diameter of said spherical ball means; and connecting means for connecting said bracket to the other one of said support member and said mounting member.

2. The work holder support apparatus of claim 1, wherein said locking means comprises:

said bracket having at least two longitudinal apertures therethrough with a portion of each of said apertures having threads;

said engaging means having a generally diametrical parting line such that one portion of said partial spherical surface defining said aperture is moveable with respect to the other portion of said partial spherical surface defining said aperture allowing insertion of said spherical ball means, said parting line also separating said longitudinal aperture into first and second portions; and at least two bolts disposed parallel to one another and spaced apart from one another by a distance greater than said diameter of said spherical ball means, said bolts engageable through said first and second portions of said longitudinal aperture and mateable with said threads of said aperture for holding said portions in position with respect to one another and for locking said spherical ball means in position with respect to said bracket.

3. The work holder support apparatus of claim 1 further comprising ball and socket joint means disposed between said engaging means and said connecting means on said bracket.

4. The work holder support apparatus of claim 3 wherein said ball and socket joint means comprises:

a spherical ball adjacent to said first end of said bracket integral with said connecting means;

said bracket having a partial spherical surface defining a recess formed adjacent said middle portion of said bracket adapted to receive said spherical ball;

a clamp plate;

mounting means for mounting said clamp plate with one side of said plate in facing opposed relationship to said bracket, said mounting means including said at least two bolts of said locking means;

socket means on said plate cooperatively defining a partial spherical socket surface conformed to partially enclose said ball in a ball and socket relationship in cooperation with said partial spherical surface of said bracket, said mounting means operable when tightened to fixedly clamp said socket against rotative movement relative to said ball.

5. A work holder support apparatus for supporting a workpiece holder from a support member, the workpiece holder having an actuator with an axially extending driven member for operable connection with a gripper, the work holder support apparatus comprising;

a mounting member for connection to the workpiece holder disposed between the actuator and the gripper of the workpiece holder, the mounting member having passage means for allowing operable connection of the driven member of the actuator with the gripper, said mounting member having an axially extending peripheral side surface;

first ball and socket means disposed between the mounting member and the support member for connecting the mounting member to the support member, said first ball and socket means including a first ball having a predetermined diameter and a first socket for receiving said first ball; and locking means operable when engaged for fixedly locking said first ball and socket means against rotative movement, said locking means including at least two bolts disposed parallel to one another and spaced apart from one another by a distance greater than said diameter of said first ball.

6. The work holder support apparatus of claim 5 further comprising:

said mounting member including an elongated bracket having first and second ends;

said first ball and socket means disposed between the first end of the elongated bracket and the support member;

second ball and socket means disposed between the second end of the elongated bracket and the workpiece holder for connecting the bracket to the workpiece holder; and said locking means operable when engaged for fixedly locking the first and second ball and socket means against rotative movement.

7. A work holder support apparatus for supporting a workpiece holder from a support member, the workpiece holder having an actuator with an axially extending driven member for operable connection to a gripper, the work holder support apparatus comprising:

a mounting member for connection to the workpiece holder disposed between the actuator and the gripper of the workpiece holder, the mounting member having an aperture allowing passage of the driven member from the actuator to the gripper and an axially extending peripheral side edge, said mounting member having at least one radially extending portion from said peripheral side edge, said radially extending portion positionable at any one of a plurality of angular positions with respect to said axially extending driven member;

a bracket;

spherical ball means having a predetermined diameter, said spherical ball means disposed between the bracket and the mounting member for adjustably connecting the bracket to the mounting member at a desired orientation;

locking means for locking said bracket in said desired orientation, said locking means including at least two bolts extending parallel to one another and spaced apart from one another a distance greater than said diameter of said spherical ball means; and connecting means for connecting said bracket to said support member.

8. The work holder support apparatus of claim 7 wherein the connecting means further comprises:

second spherical ball means disposed between the bracket and the support member for adjustably connecting the bracket to the support member at a desired orientation; and said locking means for locking said bracket in said desired orientation with respect to said support member.

9. A work holder support apparatus for supporting a workpiece holder from a support member, the workpiece holder having a fluid operated actuator portion at one end with an axially extending driven member for operable connection with a gripper portion at another end, the work holder support apparatus comprising:

a mounting member having an axially extending peripheral side edge, said mounting member interposed between said actuator portion and said gripper portion of said holder, said mounting member having an aperture allowing passage of said driven member extending from said fluid operated actuator portion for operable connection with said gripper portion of said holder; and connecting means extending radially outwardly from said peripheral side edge for connecting said mounting member to said support member, said mounting member positionable in any one of a plurality of angular positions with respect to said axially extending driven member to orientate said connecting means at a desired position while allowing independent orientation of said gripper portion.

10. The work holder support apparatus of claim 9 wherein said connecting means further comprises:

spherical ball and socket means having a predetermined diameter, said spherical ball and socket means for connecting said support member to said mounting member at a desired location; and locking means for locking said spherical ball and socket means in a desired orientation, said locking means including at least two bolts extending parallel to one another and spaced apart from one another by a distance greater than said predetermined diameter.

11. The work holder support apparatus of claim 10 wherein said locking means comprises:

said mounting member having at least two longitudinal apertures therethrough with a portion of each of said longitudinal apertures having threads;

engaging means having a generally diametrical parting line such that one portion of a partial spherical surface defining an aperture is movable with respect to another portion of said partial spherical surface defining said aperture allowing insertion of said spherical ball and socket means, said parting line also separating each of said longitudinal apertures into first and second portions; and at least two bolts engageable through said first and second portions of said longitudinal apertures and mateable with said threads of said apertures for holding said portions in position with respect to one another and for locking said spherical ball and socket means in position with respect to said mounting member.

12. The work holder support apparatus of claim 9 further comprising:
   ball and socket joint means disposed between said mounting member and said connection means.

13. The work holder support apparatus of claim 12 wherein said ball and socket means comprises:
   a spherical ball adjacent to a first end of said mounting member integral with said connecting means, said spherical ball having a predetermined diameter;
   said mounting member having a partial spherical surface defining a recess formed adjacent a middle portion of said mounting member adapted to receive said spherical ball;
   a clamp plate;
   mounting means for mounting said clamp plate with one side of said plate in facing opposed relationship to said mounting member, said mounting means including at least two bolts extending parallel to one another and spaced apart from one another by a distance greater than the diameter of said spherical ball; and
   socket means formed on said plate cooperatively defining a partial spherical surface defining socket conformed to partially enclose said ball in a ball and socket relationship in cooperation with said partial spherical surface of said mounting member, said mounting means operable when tightened to fixedly clamp said socket against rotative movement relative to said ball.

14. A work holder support apparatus for supporting a workpiece holder having a fluid operated actuator portion at one end with a driven member extending for connection with a gripper portion at another end, the work holder support apparatus comprising:
   means defining a spherical ball mounted on said support member at a desired location, said spherical ball means having a predetermined diameter;
   an elongated bracket having first and second ends;
   a first clamp plate engageable with the first end of said elongated bracket with socket means disposed between said bracket and said first clamp plate having a partial spherical surface defining aperture for engaging said spherical ball means such that said bracket is rotatable about said spherical ball means for locating said bracket in a desired orientation between said support member and said workpiece holder;
   locking means for locking said first clamp plate against rotative movement with respect to said spherical ball means to hold said bracket in a desired orientation, said locking means including at least two bolts disposed parallel to one another and spaced apart from one another by a distance greater than the diameter of said spherical ball means; and
   connecting means for connecting said bracket to said workpiece holder, said connecting means including a mounting plate interposed between said actuator portion and said workpiece gripper portion of said holder, said mounting plate having an aperture allowing passage of said driven member extending from said fluid operated actuator portion for operable connection with said gripper portion of said holder.

15. A work holder support apparatus for supporting a workpiece holder from a support member, the workpiece holder having an actuator portion and a gripper portion, the work holder support apparatus comprising:
   a first joint connected between the support member and the workpiece holder, the first joint including a first ball having a predetermined diameter and a first member having a first partial spherical surface defining a first portion of a first socket, said first member cooperable with a second partial spherical surface associated with said workpiece holder defining a second portion of said first socket; and
   at least two bolts disposed parallel to one another and spaced apart from one another by a distance greater than said predetermined diameter of said first ball for connecting said first member in association with said workpiece holder to define said first socket and for locking said first ball within said first socket in a desired position.

* * * * *